(12) United States Patent
Birke et al.

(10) Patent No.: US 7,638,455 B2
(45) Date of Patent: Dec. 29, 2009

(54) CATALYST AND HYDROTREATING PROCESS

(75) Inventors: Peter Birke, Leuna (DE); Frank Heinz Goerlitz, Leuna (DE); Wigbert Gerhard Himmel, Leuna (DE); Jürgen Hunold, Leuna (DE); Hans-Heino John, Leuna (DE)

(73) Assignee: Shell Oil Company, Houston, TX (US)

( * ) Notice: Subject to any disclaimer, the term of this patent is extended or adjusted under 35 U.S.C. 154(b) by 443 days.

(21) Appl. No.: 11/683,890

(22) Filed: Mar. 8, 2007

(65) Prior Publication Data

US 2008/0009408 A1 Jan. 10, 2008

(30) Foreign Application Priority Data

Mar. 9, 2006 (EP) .................................. 06004832

(51) Int. Cl.
| | |
|---|---|
| B01J 21/18 | (2006.01) |
| B01J 23/00 | (2006.01) |
| B01J 23/40 | (2006.01) |
| B01J 23/42 | (2006.01) |
| B01J 23/56 | (2006.01) |
| B01J 23/44 | (2006.01) |
| B01J 23/70 | (2006.01) |
| B01J 23/74 | (2006.01) |
| B01J 23/08 | (2006.01) |
| C01F 7/02 | (2006.01) |

(52) U.S. Cl. .................. 502/182; 502/305; 502/313; 502/315; 502/316; 502/319; 502/320; 502/321; 502/322; 502/325; 502/326; 502/327; 502/332; 502/333; 502/334; 502/335; 502/336; 502/337; 502/338; 502/339; 502/323; 502/355; 423/625; 423/626; 423/628; 423/630; 423/631

(58) Field of Classification Search ................. 502/182, 502/305, 313, 315, 316, 319–323, 325–327, 502/332–339, 355; 423/625, 626, 628, 630, 423/631

See application file for complete search history.

(56) References Cited

U.S. PATENT DOCUMENTS 3,630,888 A   12/1971   Alpert et al. ................. 208/109

(Continued)

FOREIGN PATENT DOCUMENTS

DE   1803773   6/1969

(Continued)

OTHER PUBLICATIONS

Brunauer, Emmet and Teller in *J.Am.Chem.Soc.* 60 (1938) 309-316.

(Continued)

*Primary Examiner*—Patricia L Hailey
(74) *Attorney, Agent, or Firm*—Charles W. Stewart

(57) ABSTRACT

A process for the preparation of a catalyst, which process comprises the steps of:
i) mixing an alumina precursor with combustible carbon-containing fibers with a diameter in the range of from 0.5 to 5 μm and a length of no greater than 100 μm in an amount in the range of from 20 to 40 wt % based on the total dry mixture;
ii) adding nitric acid and water to form an extrudable mass;
iii) extruding the mixture to form shaped particles;
iv) drying the shaped particles;
v) heating the particles in an atmosphere comprising no more than 5 vol % oxygen at a temperature in the range of from 350 to 600° C.; and
vi) then heating the particles in a gas mixture comprising at least 12 vol % oxygen at a temperature in the range of from 450 to 600° C.

10 Claims, 1 Drawing Sheet

Pore size distribution

U.S. PATENT DOCUMENTS

| | | | | |
|---|---|---|---|---|
| 3,853,789 | A | 12/1974 | Warthen et al. | 252/463 |
| 3,947,347 | A | 3/1976 | Mitchell | 208/251 |
| 4,001,144 | A * | 1/1977 | Pearson et al. | 502/439 |
| 4,411,771 | A | 10/1983 | Bambrick et al. | 208/112 |
| 4,448,896 | A | 5/1984 | Kageyama et al. | 502/314 |
| 4,498,972 | A | 2/1985 | Toulhoat et al. | 567/207 |
| 4,499,203 | A | 2/1985 | Toulhoat et al. | 502/247 |
| 5,139,978 | A * | 8/1992 | Wood | 501/127 |
| 6,245,919 | B1 * | 6/2001 | Shinozaki et al. | 548/512 |
| 6,429,172 | B1 * | 8/2002 | Tsukada et al. | 502/439 |
| 6,518,219 | B1 * | 2/2003 | Yang et al. | 502/314 |
| 6,656,875 | B1 * | 12/2003 | Le Loarer et al. | 502/355 |
| 7,265,075 | B2 * | 9/2007 | Tsukada et al. | 502/208 |

FOREIGN PATENT DOCUMENTS

| | | |
|---|---|---|
| DE | 3220671 | 12/1982 |
| EP | 237240 | 9/1987 |
| EP | 399592 | 11/1990 |
| EP | 714699 | 6/1996 |
| GB | 867247 | 5/1961 |
| GB | 943553 | 12/1963 |
| JP | 05184941 | 7/1993 |
| NL | 8403107 | 7/1969 |

OTHER PUBLICATIONS

Periodic table according to IUPAC Nomenclature of Inorganic Chemistry, Recommendations 1990, Blackwell Scientific Publications, 1990, Edited by G J Leigh.

* cited by examiner

CATALYST AND HYDROTREATING PROCESS

FIELD OF THE INVENTION

The present invention relates to a catalyst and a process for hydrotreating hydrocarbon fractions.

BACKGROUND OF THE INVENTION

The continuous operation of fixed bed reactors in the hydrotreatment of hydrocarbon fractions is limited by the lifetime of the catalyst within the fixed bed and the pressure drop across the fixed bed. Both these factors are affected by metallic contaminants within the hydrocarbon fraction to be treated. Metallic contaminants such as iron, vanadium, arsenic and nickel compounds are well known as catalyst poisons, drastically reducing the useful lifetime of hydrotreating catalysts. Suspended metallic material may also be deposited within the catalyst bed, blocking catalyst pores and voids between catalyst particles and restricting the flow of oil and gas, leading to pressure drop.

Processes for removing solid as well as dissolved metallic contaminants from hydrocarbon fractions have been described in the art. For example, in EP-A-0,399,592 a hydrotreating process is disclosed for the removal of solid and dissolved metallic contaminants using as the catalyst porous inorganic oxide particles having a surface area of at most 1 $m^2/g$ and a pore volume of at least 0.1 ml/g in pores having a diameter of at least 10 microns. The inorganic oxide may additionally contain oxides or sulphides of metals of group VA, VIA and/or VIII. JP-A-05/184941 describes a hydrotreating process for removing solids and dissolved contaminants, wherein a catalyst is used having a surface area above 5 $m^2/g$, a pore volume of 0.1 $cm^3/g$ in micropores having a diameter of at least 0.004 micron (40 Å) and a void ratio of 30 to 70%. The catalyst may also additionally contain oxides or sulphides of metals of group V, VI and/or VIII. In U.S. Pat. No. 3,947,347 a process for removing metallic contaminants from a hydrocarbon feedstock is disclosed, in which process a catalyst is used which is free of any hydrogenating component and which has a surface area of from 1 to 20 m2/g and pores having an average diameter of from 0.1 to 1 micron (1,000 to 10,000 Å). EP-A-0,714,699 discloses a catalyst comprising both macroporosity and microporosity for the removal of both solid and dissolved metallic contaminants from a hydrocarbon oil.

Higher surface area catalysts and support materials are disclosed inter alia in NL-A-8,403,107 and U.S. Pat. No. 3,853,789. NL-A-8,403,107 discloses a high surface area (in excess of 100 $m^2/g$) catalyst, which has feeder macropores connecting to catalytically active micropores for metals and sulphur removal from asphalt-containing hydrocarbons. U.S. Pat. No. 3,853,789 discloses high surface area (200 to 400 $m^2/g$) alumina material with a substantial macroporosity.

Also described in the art are methods of producing porous hydrogenation catalysts having a bimodal pore distribution, wherein the macropores or channels are provided by the incorporation of removable carbon-containing substances into the alumina support and their subsequent removal by heating or another method. For example, GB-A-867,247 describes a method for the production of a catalyst, comprising pores with diameters in the range of from 4000 to 15000 nm, by mixing 1 to 2 wt % of cellulose fibres with alumina/silica before forming particles from the mixture and calcining the particles to remove the fibres and form a catalyst support. GB-A-943,553 is directed to a process for hydrogenative refining by contacting hydrocarbon fractions with a catalyst produced by the incorporation of metals from group VIA and VIII of the periodic table onto such a support. DE-A-1,803,773 is directed to improving the lifetime of a hydrotreating catalyst by producing it in such a manner that the catalyst particles comprise a large number of randomly oriented channels, with diameters in the range of from 0.1 to 100 μm, essentially uniformly distributed in the particle and providing in the range of from 0.05 to 0.10 $cm^3/g$ of the total pore volume of the catalyst particles. These channels are formed by incorporating fibres into a mixture of catalyst components before forming particles and then destroying the fibres. The production of a hydrotreating catalyst with a bi-modal pore distribution comprising 10% of the pore volume in macropores in the range of from 200 to 1500 nm is described in U.S. Pat. No. 4,448,896. Such a pore distribution is achieved by the incorporation of carbon black into the alumina of the catalyst before forming shaped particles and then calcining them in an oxygen-containing stream to burn off the carbon black.

Regardless of the advances described in the prior art, there still remains the need for improved catalysts for the demetallisation of hydrocarbon fractions. It is the aim of this invention to provide a catalyst with an increased uptake capacity for metallic contaminants thus allowing longer operation times and lower pressure drops when used in a process for hydrotreating hydrocarbon fractions comprising such contaminants.

SUMMARY OF THE INVENTION

The present invention provides a process for the preparation of a catalyst, which process comprises the steps of:
  i) mixing an alumina precursor with combustible carbon-containing fibres with a diameter in the range of from 0.5 to 50 μm and a length of no greater than 1000 μm in an amount in the range of from 20 to 40 wt % based on the total dry mixture;
  ii) adding nitric acid and water to form an extrudable mass;
  iii) extruding the mixture to form shaped particles;
  iv) drying the shaped particles;
  v) heating the particles in an atmosphere comprising no more than 5 vol % oxygen at a temperature in the range of from 350 to 600° C.; and
  vi) then heating the particles in a gas mixture comprising at least 12 vol % oxygen at a temperature in the range of from 450 to 600° C.

The present invention further provides a catalyst comprising alumina and at least one metal selected from the group consisting of Group 6 metals and Group 8,9 or 10 metals, wherein the catalyst has:
  i) a total pore volume of at least 0.40 $cm^3/g$;
  ii) a pore volume of at least 0.15 $cm^3/g$ in pores having a diameter in the range of from 3 to 10 nm;
  iii) a pore volume of at least 0.25 $cm^3/g$ in pores having a diameter in the range of from 100 to 5000 nm; and
  iv) a surface area in the range of from 50 to 350 $m^2/g$, wherein pore volume is measured by mercury intrusion porosimetry according to DIN 6613 and surface area is measured according to the B.E.T. method.

Also provided by the present invention is a process for the demetallisation of hydrocarbon fractions, which process comprises contacting a hydrocarbon fraction with the catalyst of the present invention or prepared according to the process of the present invention.

BRIEF DESCRIPTION OF THE DRAWING

The drawing (FIG. 1) shows the pore size distribution of catalyst C.

DETAILED DESCRIPTION OF THE INVENTION

Figure 1:
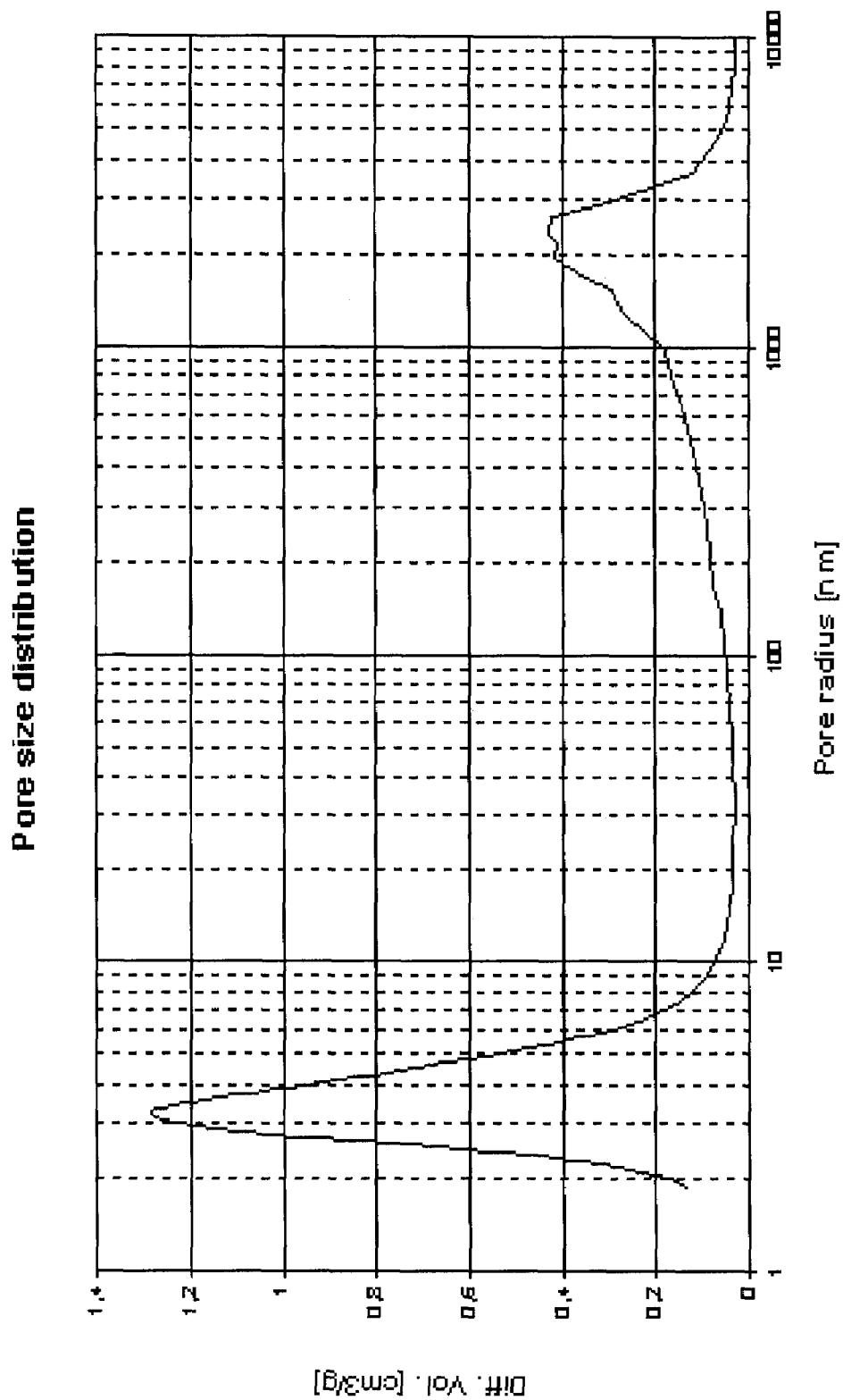

It has now been found that a process comprising mixing an alumina precursor and combustible carbon-containing fibres, with a diameter in the range of from 0.5 to 50 μm and a length of no greater than 1000 μm in an amount in the range of from 20 to 40 wt % based on the total dry mixture, with nitric acid and water, extruding the resultant mixture, drying the extrudates and then submitting the extrudates to a two-step calcination process comprising first heating the particles in an atmosphere comprising no more than 5 vol % oxygen at a temperature in the range of from 350 to 600° C. and then heating the particles in a gas mixture comprising at least 12 vol % oxygen at a temperature in the range of from 450 to 600° C., provides a highly efficient demetallising catalyst with an increased uptake capacity for metals that act as catalyst poisons to hydrotreating catalysts. The use of such catalysts leads to a significant extension in the lifetime of subsequent hydrotreating catalyst beds.

As used herein, an alumina precursor refers to a compound that after undergoing the process of the present invention forms alumina (aluminium oxide). Suitable alumina precursors include aluminum oxide hydroxides (AlOOH) such as pseudoboehmite and boehmite, aluminum hydroxides (Al(OH)$_3$) such as bayerite or hydrargillite, gamma-alumina, eta-alumina and mixtures of these components. Preferably, the alumina precursor is pseudoboehmite. When pseudoboehmite is used as the alumina precursor, it is preferably present as a fine powder, for example with a particle size in the range of from 0.05 to 5 μm.

As used herein, the term 'fibre' refers to its normal definition, that is a particle having a ratio of length to width of at least 3:1.

The carbon-containing fibres used in the present invention are combustible, i.e. they are capable of ignition or burning. Preferably, carbon-containing fibres that leave behind no, or very little, residue after the process of the invention are used. Suitable carbon-containing fibres include natural fibres such as cotton cellulose, jute and sisal and man-made fibres such as viscose, nylon, polyethylene, polyamide, polyesters, polyacrylnitrile, polypropylene, polyvinyl alcohol, aramide and carbon fibres. Preferably, the fibres comprise cotton cellulose, jute or sisal. A particularly suitable carbon-containing fibre is cotton cellulose. Fibres used in the process of the invention have a diameter in the range of from 0.5 to 50 μm, preferably in the range of from 1 to 10 m. The length of the fibres is suitably no greater than 1000 μm. Preferably, the length of the fibres is at most 900 μm, more preferably at most 500 μm. Suitably the fibres are at least 30 μm, preferably at least 50 μm, more preferably at least 100 μm in length.

The amount of fibres used in the process of the present invention is at least 20 wt % based on the total dry, uncalcined mixture. Preferably an amount of at least 22 wt % is used; however larger amounts, for example an amount of at least 25 wt % can also be used and provide useful catalysts. The amount of fibres used in the process of the present invention is at most 40 wt %, preferably at most 30 wt %, based on the total dry uncalcined mixture.

After mixing the alumina precursor and the combustible carbon-containing fibres, nitric acid and water are added. Advantageously, nitric acid is added in a molar ratio of nitric acid to alumina, as HNO$_3$ to Al$_2$O$_3$, in the range of from 0.05 to 0.15. Without wishing to be restricted by theory, it is believed that such a range ensures good peptisation of the alumina precursor and that good peptisation is necessary to provide good mechanical stability to the composition.

Water is added in an amount suitable to form the mixture into an extrudable mass. It is envisaged that a wide range of amounts of water would prove suitable and that a person skilled in the art could easily determine an amount within the scope of the present invention. The optimal amount of water will vary dependent on the amounts of the individual components. Particularly suitable amounts, however, are amounts that lead to a moisture content in the extrudable mass of in the range of from 20 to 70%, preferably in the range of from 30 to 65% as measured by a moisture analyser, such as the Mettler Toledo Moisture Analyser HB43.

The mixture may then be extruded by any suitable method known in the art. Preferably, extrusion is carried out using a screw extrusion press. Suitable shapes for the shaped particles include those with circular cross-sections. Preferably, the shaped particles have a non-circular cross-section. Suitable shapes with non-circular cross-sections include, but are not limited to, tri-lobed, spiral-grooved, vortex-profiled and tetra-lobed forms. A suitable shape should be chosen in order to maximise the ratio of geometrical surface area to volume and to obtain an optimal void volume allowing the good permeation of gas and oil through the catalyst bed even after the deposition of dust and coke resulting from a long catalyst lifetime.

The shaped particles suitably have a diameter in the range of from 0.5 to 10 mm, preferably in the range of from 1 to 7 mm. When referring to particles with non-circular cross-sections, the term diameter refers to the diameter of the smallest circle within which the particle cross-section would fit.

The shaped particles are suitably dried at a temperature in the range of from 50 to 120° C., for example at a temperature in the range of from 60 to 110° C. Preferably, the drying is carried out in air.

The dried particles are calcined in a two-step process. Firstly, the particles are heated in an atmosphere comprising at most 5 vol % oxygen, preferably in an inert atmosphere. Advantageously, such an atmosphere comprises nitrogen. Suitably this heating step is carried out at a temperature in the range of from 350 to 600° C., preferably at a temperature in the range of from 350 to 450° C.; though the heating step may be carried out at a temperature of from 450 to 600° C. By heating the dried particles in an inert atmosphere, the carbon-containing fibres are thermally decomposed in a coking process, releasing decomposition products comprising carbon dioxide, carbon monoxide, water, gaseous and liquid pyrolysis products and nitrogen oxides. In an atmosphere comprising at most 5 vol % oxygen, thermal decomposition of the fibres by means of a coking process will still predominate. A small percentage of the carbon, formed in the coking process, on the outer surface of the particles will react with any oxygen present in the atmosphere and be burned off. However, inside the particles the reaction will be limited to the coking of the carbon-containing fibres. The decomposition products are preferably removed in the waste inert gas stream and subjected to catalytic or thermal incineration.

The particles are then heated in a gas mixture comprising at least 12 vol % oxygen at a temperature in the range of from 450 to 600° C., preferably in the range of from 450 to 500° C. The gas mixture is preferably air. Such a process will remove the remaining carbon from the particles.

Optionally, after calcination, size reduction may be carried out to produce particles of the desired length. This can be carried out by any suitable means known in the art. A suitable length for the particles of the present invention is in the range of from 1.5 to 5 times the diameter of the particles. Further, the particles may be sieved to remove dust.

It is also advantageous to incorporate metals into the catalyst in order to provide a hydrogenative catalyst capable of the hydrogenative decomposition of metal poisons and other impurities found in hydrocarbon fractions.

Such metals may be incorporated into the catalyst composition by any suitable method known in the art, for example by impregnation of the catalyst composition following calcination or by mixing suitable metal compounds with the alumina precursor and combustible carbon-containing fibres before forming the shaped particles. Preferably, the metals are incorporated by mixing at least one metal compound with the alumina precursor and the combustible carbon-containing fibres before forming the shaped particles.

Suitable metals to be incorporated into the catalyst composition of the invention include those in groups 6 and 8,9 or 10 of the periodic table (according to IUPAC Nomenclature of Inorganic Chemistry, Recommendations 1990, Blackwell Scientific Publications, 1990, Edited by G J Leigh).

Preferably the group 6 metal, if present, is selected from chromium, molybdenum and tungsten. Most preferably the group 6 metal is molybdenum or tungsten. Suitable molybdenum compounds include molybdenum (VI) oxide and ammonium molybdate. Suitable tungsten compounds include tungsten (VI) oxide and ammonium tungstate. Preferably, the group 8,9 or 10 metal, if present, is selected from ruthenium, osmium, cobalt, rhodium, iridium, nickel, palladium and platinum. More preferably, the group 8, 9 or 10 metal is selected from nickel, cobalt, palladium and platinum. Nickel and cobalt are particularly preferable as the group 8, 9 or 10 metal. Suitable nickel compounds include nickel nitrate, nickel acetate, nickel formate, nickel oxide, nickel aluminate, nickel silicate and $NiO/Al_2O_3$ in powder form. Suitable cobalt compounds include cobalt acetate, cobalt formate, cobalt oxide, cobalt silicate and cobalt aluminate.

Preferably compounds of both group 6 and group 8,9 or 10 metals are incorporated into the composition of the invention. Combinations of any group 6 and group 8,9 or 10 metals are suitable. Particularly preferred combinations include nickel and molybdenum, cobalt and molybdenum or nickel and tungsten.

The amount of metal comprised within the catalysts of the present invention can be tailored to suit the feed with which the finished catalyst will be contacted. Suitable amounts of group 6 metal are in the range of from 0.1 to 30 wt %, preferably 1 to 20 wt %, more preferably 8 to 15 wt % of the dry mixture calculated as the element. Suitable amounts of group 8, 9 or 10 metal are in the range of from 0.1 to 20 wt %, preferably 0.5 to 5 wt %, more preferably 2 to 4 wt % of the dry mixture calculated as the element. In one preferred embodiment of the invention, a catalyst composition is produced such that the finished catalyst comprises from 1 to 15 wt % of nickel oxide (as NiO) and 5 to 25 wt % of molybdenum oxide (as $MoO_3$). In another preferred embodiment, when the catalyst is to be used as an arsenic trap, the catalyst advantageously comprises nickel and molybdenum with nickel oxide (as NiO) present in the range of from 8 to 12 wt %.

Further treatments, such as sulphiding, may be applied to the catalysts of the present invention after calcination, in order to provide improved activity in the finished catalyst.

Catalysts according to the present invention and comprising alumina and at least one metal selected from the group consisting of group 6 metals and group 8, 9 or 10 metals and also comprising:

i) a total pore volume of at least 0.40 $cm^3/g$;

ii) a pore volume of at least 0.15 $cm^3/g$ in pores having a diameter in the range of from 3 to 10 nm;

iii) a pore volume of at least 0.25 $cm^3/g$ in pores having a diameter in the range of from 100 to 5000 nm; and iv) a surface area in the range of from 50 to 350 $m^2/g$, are particularly effective as catalysts for trapping catalyst poisons.

As used herein, pore volume is measured by mercury intrusion porosimetry according to DIN 6613. The total pore volume of the catalysts is preferably at least 0.55 $cm^3/g$. Suitably the total pore volume of the catalysts is at most 0.80 $cm^3/g$. The catalysts of the present invention possess pores having a diameter in the range of from 1 to 20 nm, preferably in the range of from 2 to 10 nm. Preferably, the pore volume of the catalysts in pores with a diameter in the range of from 3 to 10 nm is at least 0.25, more preferably at least 0.30 $cm^3/g$. Preferably, the pore volume of the catalysts in pores with a diameter in the range of from 3 to 10 nm is at most 0.5 $cm^3/g$, more preferably at most 0.40 $cm^3/g$. The catalysts of the present invention also have a high proportion of macropores in the range of from 100 to 5000 nm, particularly in the range of from 250 to 5000 nm. Suitably a pore volume in the range of from 0.25 to 0.35 $cm^3/g$ is present in pores with a diameter in the range of from 100 to 5000 nm. Preferably a pore volume in the range of from 0.20 to 0.35 $cm^3/g$ is present in pores with a diameter in the range of from 250 to 5000 nm.

As used herein, the surface area of a catalyst is measured by the BET method. The B.E.T. method of measuring surface area has been described in detail by Brunauer, Emmet and Teller in *J. Am. Chem. Soc.* 60 (1938) 309-316. Preferably the surface area of the catalyst is in the range of from 150 to 250 $m^2/g$.

When used in a hydrotreating process, the catalysts of the present invention are suitably used in the form of a fixed bed of catalyst particles over which the hydrocarbon feed is passed.

The hydrotreating process of the present invention is carried out under conventional hydrotreating conditions, for example a total pressure of 100 to 30000 kPa, a hydrogen partial pressure of 100 to 25000 kPa, a temperature of from 200 to 500° C. and a hydrogen to hydrocarbon ratio of 50 to 3000 Nl/l.

Hydrocarbon fractions suitable for treatment by the composition of the present invention can include any hydrocarbon fraction comprising metallic contaminants. Particularly suitable are high-boiling products such as vacuum distillates, tar oils and distillation residues.

Contaminants that are removed by the composition of the present invention include a wide range of dissolved and solid metallic species such as iron species, sodium species, calcium species, molybdenum species, nickel species, arsenic species and vanadium species. In particular, the metallic species present that will be removed from the hydrocarbon feed may include nickel and vanadium porphyrins, iron naphthenates, iron phenolates and arsenic in the form of arsine ($AsH_3$) or as an organic compound.

Such compounds may be trapped by the catalysts of the present invention in amounts up to 25 to 50 wt %, based on the weight of the catalyst. As well as trapping such compounds, catalysts of the present invention may also remove sulphur and nitrogen from the hydrocarbon fraction.

The composition or catalyst may be tailored to suit the specific hydrocarbon fraction to be treated. If the hydrocarbon fraction still contains sulphur and nitrogen compounds, it is particularly suitable to use a composition comprising nickel and molybdenum. Such a composition should be sulphided before use. This can be carried out either before the catalyst is placed in the reactor or while the catalyst is in situ by suitable means known in the art. A catalyst comprising nickel and molybdenum is also particularly suitable when the catalyst is to be used as an arsenic trap.

Catalysts of the present invention are very advantageously used as protective catalysts within a hydrocarbon hydrotreating process. The catalysts would then be installed upstream of the hydrogenative catalyst bed. This may be as a catalyst bed in a separate reactor, as a separate catalyst bed within the same reactor as the hydrogenative catalyst bed or as a layer of catalyst within the same bed as the hydrogenative catalyst.

The following Examples will illustrate the invention.

EXAMPLES

Example 1

Catalyst A (Comparative)

For catalyst A, gamma-alumina extrudates 2.5 mm in diameter, 4 to 7 mm long, with a specific surface area of 260 m$^2$/g and a relatively uniform pore distribution between 3 and 6 nm were used as supports. These supports were impregnated with an impregnation solution comprising nickel nitrate, ammonium molybdate and phosphoric acid, using a pore volume saturation method. The concentrations of the metal compounds in the impregnation solution were chosen such that the finished catalyst had the composition detailed in Table 1. After impregnation, the catalysts were dried and calcined at 500° C., in air. The properties of the catalyst are shown in Tables 1 and 2.

Example 2

Catalyst B (Comparative)

540 g of pseudoboehmite (aluminum oxide hydroxide) was mixed thoroughly with 131 g of ammonium molybdate, 70 g of nickel nitrate and 45 g of cotton cellulose fibres (equivalent to 5.7 wt % based on the dry mixture). The fibres used were Schwarzwälder Textilwerke (STW) fibres, type FB 24/040 with lengths in the range of from 50 to 500 µm and diameters in the range of from 5 to 10 µm. Enough water was added to produce an extrudable mass and the mass was then extruded to give extrudates 2.5 mm in diameter. The extrudates were dried at 120° C. for 3 hours and then heated at 500° C., in air, in a muffle furnace for 5 hours. The composition and properties of catalyst B are shown in Tables 1 and 2.

Example 3

Catalyst C 176 kg of pseudoboehmite (aluminum oxide hydroxide) was mixed thoroughly with 63 kg of cotton cellulose fibres (equivalent to 22 wt % based on the dry mixture), 25 kg of MoO$_3$, 5.3 kg of Ni as a nickel nitrate solution, 1.6 kg of an ethoxylated cellulose (Tylose MH 1000 P2, Clariant GmbH), 8.5 kg of nitric acid and enough water (approximately 145 liters) to make the water content of the mixture 60% (as measured with a Mettler Toledo HB43 Moisture Analyzer). The fibres used were Schwarzwälder Textilwerke (STW) fibres, type FB 24/040 with lengths in the range of from 50 to 500 µm and diameters in the range of from 5 to 10 µm. The mixture was then extruded using a screw extrusion press to produce extrudates 2.5 mm in diameter, which were then dried at a maximum temperature of 120° C. for 5 hrs. The dried extrudates were heated in a stream of nitrogen in a rotary tubular kiln for 30 minutes at 400° C. and then heated for 3 hrs at 500° C. in a stream of air. The composition and properties of the finished catalyst are shown in Tables 1 and 2.

Example 4

Catalyst D

This catalyst was prepared by an analogous procedure to that for catalyst C except that 13 kg Ni as a nickel nitrate solution was used to produce a final catalyst with a nickel oxide content of 8 wt %.

TABLE 1

Chemical Composition and Properties of Catalysts A to D

| | Catalyst | | | |
|---|---|---|---|---|
| | A | B | C | D |
| NiO (wt %) | 3.5 | 4.5 | 3.5 | 8.0 |
| MoO$_3$ (wt %) | 17 | 20 | 15 | 15 |
| [PO$_4$]$^{3-}$ (wt %) | 9 | 0 | 0 | 0 |
| Al$_2$O$_3$ (wt %) | to 100 | to 100 | to 100 | to 100 |
| Specific surface area (m$^2$/g)* | 190 | 300 | 250 | 250 |
| Particle density (g/cm$^3$) | 1.45 | 1.15 | 1.04 | 1.04 |
| Bulk density (kg/l) | 0.75 | 0.65 | 0.52 | 0.52 |

*measured according to the B.E.T. method

TABLE 2

Pore volumes of the Catalysts as a Function of Pore Diameter

| | Catalyst | | | |
|---|---|---|---|---|
| | A | B | C | D |
| Total pore volume (cm$^3$/g) | 0.40 | 0.55 | 0.69 | 0.65 |
| Pore volume in pore diameter 3 to 10 nm (cm$^3$/g) | 0.37 | 0.35 | 0.37 | 0.33 |
| Pore volume in pore diameter 10 to 100 nm (cm$^3$/g) | 0.02 | 0.05 | 0.02 | 0.02 |
| Pore volume in pore diameter 100 to 1000 nm (cm$^3$/g) | 0.01 | 0.15 | 0.30 | 0.30 |
| Pore volume in pore diameter 250 to 5000 nm (cm$^3$/g) | — | — | 0.28 | 0.28 |

Pore volume measured according to DIN 6613

Example 5

Catalyst Testing

Permeable cylindrical 250 ml wire cages were filled with the catalysts and the cages were then securely closed. The surface of these cages was permeable 1 mm wire gauze, stable towards gas containing hydrogen sulphide. The filled cages were installed as the topmost catalyst layer in industrial scale reactors and remained in place for a 3 year cycle. The oil treated by the reactors contained in the range of from 0.5 to 5 ppm vanadium, in the range of from 0.2 to 2 ppm nickel and in the range of from 1 to 200 ppb arsenic. After 3 years the catalysts were removed from the cages and analysed. The quantities of heavy metals present in the catalyst after the 3 year cycle are shown in Table 3.

TABLE 3

Heavy Metal Uptake of the Catalysts

| | Catalyst | | | |
|---|---|---|---|---|
| | A | B | C | D |
| V | 2 | 8 | 24 | 25 |
| Ni* | 1.5 | 3 | 6 | 5 |
| Fe | 1.5 | 3 | 6 | 6 |
| As | 0.4 | 0.6 | 0.7 | 1.4 |

*only includes the nickel taken up from the oil

The metal uptake results in Table 3 demonstrate that catalysts C and D (of the invention) have a similar high capacity for trapping the metallic catalyst poisons. This capacity is greatly increased over that of catalyst B (comparative), which was produced by a process incorporating a smaller amount of combustible carbon-containing fibres. Catalyst A, which was produced without the incorporation of any combustible carbon-containing fibres, displayed a much lower metals uptake over the course of the test.

The catalysts of the invention therefore provide a longer-life for hydrogenating fixed-bed processes. With such an improvement, the operating cycle of a plant could be increased by a factor of two by the use of the catalyst of the invention.

Example 6

Catalysts E and F According to U.S. Pat. No. 3,630,888 (Comparative)

Both catalysts are prepared using the same cotton cellulose fibres as described for catalysts B, C and D above.

A catalyst sample E prepared according to example IX of U.S. Pat. No. 3,630,888 is produced by mixing of 1.3 kg AlOOH with 37 g cellulose fibre (equivalent to 2.77 wt % based on the dry mixture) intensively under addition of water, then extruding and drying at 260° C. for 2 hrs. The cellulose fibres are completely removed by an oxidation process in air stream from ambient temperature to 430° C. The pore distribution of this carrier material for a catalyst is listed in Table 4. The extrudates have a side crushing strength of 12 N/mm. Because of the low amount of cellulose fibre the portion of pore volume in the range of pore diameter from 100 to 5000 nm is too small, and this will never give a higher macropore volume after the impregnation with metal salt solution to manufacture a catalyst.

A catalyst sample F prepared by the same procedure as example IX of U.S. Pat. No. 3,630,888 is produced by mixing of 1.3 kg AlOOH with 465 g cellulose fibre (equivalent to 26.3 wt % based on the dry mixture) intensively under addition of water and nitric acid, then extruding and drying at 260° C. for 2 hrs. Now, it has been tried to remove the cellulose fibres completely by an oxidation process in air stream from ambient temperature to 430° C. By the violent reaction the high exotherm destroyed the structure such that the extrudates are softened and unusable for industrial catalytic purposes. The side crushing strength amounted to about 3 N/mm, whereas technical usage requires numbers higher than about 7 N/mm.

The described method according U.S. Pat. No. 3,630,888 cannot result in usable catalyst particles with a high portion of macro pore volumes in the range of diameters from 100 to 5000 nm, e. g. 0.25 cm$^3$/g or more.

Example 7

Catalyst G According to GB 943,553 (Comparative)

By usage of current useful raw materials for the catalyst production the catalyst of example 3 (modified) was reproduced.

In 823 g Pseudoboehmite AlOOH (=alumina hydrogel) were incorporated 102 g cobalt nitrate-hexahydrate, 182 g ammonium dimolybdate (84 wt % MoO$_3$), and 40 g viscose rayon fibres (equivalent to circa 3.5 wt % based on the dry mixture) of 60 µm diameter and 2.5 mm length, by intensive mixing. The addition of water to the batch under mixing produced a plastic mass, and the mass was extrudated to 5 mm particles. These were dried and calcined carefully from ambient temperature to 500° C. in a muffle oven over 16 hrs at a heating rate of 30° C./hr.

The resulting catalyst had been softened to a side crushing strength of 5 N/mm. The pore size distribution is given in Table 4. It was not possible to reach a macropore volume of higher than 0.18 cm$^3$/g. The fibres are too big in order to produce a high macropore volume of 25 cm$^3$/g or more in the range of diameters from 100 to 5000 nm.

TABLE 4

Pore volumes of the Catalysts E and G as a Function of Pore Diameter

| | Catalyst | |
|---|---|---|
| | E | G |
| Total pore volume (cm$^3$/g) | 0.74 | 0.68 |
| Pore volume in pore diameter 3 to 10 nm (cm$^3$/g) | 0.52 | 0.48 |
| Pore volume in pore diameter 10 to 100 nm (cm$^3$/g) | 0.10 | 0.02 |
| Pore volume in pore diameter 100 to 1000 nm (cm$^3$/g) | 0.12 | 0.15 |
| Pore volume in pore diameter 250 to 5000 nm (cm$^3$/g) | — | 0.03 |

What is claimed is:

1. A process for the preparation of a catalyst, which process comprises the steps of:
   i) mixing an alumina precursor with combustible carbon-containing fibres with a diameter in the range of from 0.5 to 50 µm and a length of no greater than 1000 µm in an amount in the range of from 20 to 40 wt % based on the total dry mixture;
   ii) adding nitric acid and water to form an extrudable mass;
   iii) extruding the extrudable mass to form shaped particles;
   iv) drying the shaped particles;
   v) heating the particles in an atmosphere comprising no more than 5 vol % oxygen at a temperature in the range of from 350 to 600° C.; and
   vi) then heating the particles in a gas mixture comprising at least 12 vol % oxygen at a temperature in the range of from 450 to 600° C.

2. A process as claimed in claim 1, wherein at least one metal compound selected from compounds of Group 6 metals and compounds of Group 8, 9 or 10 metals is also mixed with the alumina precursor and the combustible carbon-containing fibres.

3. A process as claimed in claim 2, wherein the Group 6 metal is selected from molybdenum or tungsten.

4. A process as claimed in claim 2, wherein the Group 8, 9 or 10 metal is selected from nickel or cobalt.

5. A process as claimed in any one of claims 1 or 2, wherein the alumina precursor is pseudoboehmite.

6. A process as claimed in any one of claims 1 or 2, wherein the combustible carbon-containing fibres are cotton cellulose.

7. A process as claimed in any one of claims 1 or 2, wherein the fibres are added in an amount in the range of from 20 to 30 wt %, preferably 20 to 25 wt %, based on the total dry mixture.

8. A process as claimed in any one of claims 1 or 2, wherein the atmosphere in step v) comprises nitrogen.

9. A process as claimed in any one of claims 1 or 2, wherein the particles are heated in step v) at a temperature in the range of from 350 to 450° C.

10. A process as claimed in any one of claims 1 or 2, wherein, in step vi), the particles are heated in a gas mixture comprising air at a temperature in the range of from 450 to 500° C.

* * * * *